United States Patent
Sun et al.

(10) Patent No.: US 10,834,705 B2
(45) Date of Patent: Nov. 10, 2020

(54) METHODS AND SYSTEMS FOR TRANSMITTING OPERATING CHANNEL INDICATORS

(71) Applicants: Sheng Sun, Ottawa (CA); Yan Xin, Ottawa (CA)

(72) Inventors: Sheng Sun, Ottawa (CA); Yan Xin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/661,508

(22) Filed: Jul. 27, 2017

(65) Prior Publication Data

US 2018/0199324 A1    Jul. 12, 2018

Related U.S. Application Data

(60) Provisional application No. 62/444,118, filed on Jan. 9, 2017.

(51) Int. Cl.
*H04W 4/00* (2018.01)
*H04W 72/04* (2009.01)
(Continued)

(52) U.S. Cl.
CPC ....... *H04W 72/0406* (2013.01); *H04W 16/28* (2013.01); *H04W 48/12* (2013.01);
(Continued)

(58) Field of Classification Search
CPC . H04W 16/28; H04W 72/0406; H04W 84/12; H04W 48/10; H04W 48/16;
(Continued)

(56) References Cited

U.S. PATENT DOCUMENTS

| | | | | |
|---|---|---|---|---|
| 9,872,206 B2* | 1/2018 | Cordeiro | ............. | H04W 40/244 |
| 2008/0013519 A1* | 1/2008 | Kwon | ................... | H04J 3/1682 |
| | | | | 370/345 |

(Continued)

FOREIGN PATENT DOCUMENTS

| | | |
|---|---|---|
| CN | 104641705 A | 5/2015 |
| CN | 104994586 A | 10/2015 |

(Continued)

OTHER PUBLICATIONS

IEEE Standard for Information Technology—Telecommunications and Information Exchange Between Systems Loyal and Metropolitan Area Networks—Part 11: Wireless LAN Medium Access Control (MAC) and Physical Layer (PHY) Specifications, section 10.36 DMG Channel Access, pp. 1500-1521.

(Continued)

*Primary Examiner* — Charles T Shedrick

(57) ABSTRACT

Systems and methods for wireless discovery and connectivity in 802.11 networks. A management frame from an access point (AP) or personal basic service set (PBSS) control point (PCP) indicates which designated channels are operating and which are non-operating, for purposes of subsequent wireless communications, such as Association Beamforming Training (A-BFT). The management frame contains a bitmap or other forms for indicating which of the designated channels are operating and which are non-operating. In response to the information received through the management frame, one or more stations (STA) can select any one of the operating channels for transmitting of frames in A-BFT communication or other access periods in the Beacon Interval.

26 Claims, 13 Drawing Sheets

(51) Int. Cl.
*H04W 16/28* (2009.01)
*H04W 76/10* (2018.01)
*H04W 74/00* (2009.01)
*H04W 48/12* (2009.01)
*H04W 84/12* (2009.01)
*H04W 88/08* (2009.01)
*H04W 48/16* (2009.01)

(52) U.S. Cl.
CPC ......... *H04W 74/006* (2013.01); *H04W 76/10* (2018.02); *H04W 48/16* (2013.01); *H04W 84/12* (2013.01); *H04W 88/08* (2013.01)

(58) Field of Classification Search
CPC ... H04W 74/006; H04W 76/02; H04W 76/10; H04W 88/08
USPC .......................................................... 370/329
See application file for complete search history.

(56) References Cited

U.S. PATENT DOCUMENTS

| | | | | |
|---|---|---|---|---|
| 2013/0329712 | A1* | 12/2013 | Cordeiro | H04W 74/04 370/338 |
| 2014/0112246 | A1 | 4/2014 | Park et al. | |
| 2016/0135199 | A1* | 5/2016 | Wang | H04W 74/0816 455/450 |
| 2016/0142929 | A1 | 5/2016 | Irie et al. | |
| 2017/0111099 | A1* | 4/2017 | Jo | H04B 7/0684 |
| 2017/0118656 | A1* | 4/2017 | Xin | H04B 7/0619 |
| 2017/0126303 | A1* | 5/2017 | Jo | H04B 7/0617 |
| 2017/0134145 | A1* | 5/2017 | Xin | H04B 7/0617 |
| 2017/0207837 | A1* | 7/2017 | Kim | H04B 7/0604 |
| 2017/0208542 | A1* | 7/2017 | Kim | H04W 52/02 |
| 2017/0352954 | A1* | 12/2017 | Abdallah | H04B 7/0695 |
| 2017/0353984 | A1* | 12/2017 | Abdallah | H04B 7/0617 |
| 2017/0367099 | A1* | 12/2017 | Cariou | H04W 72/08 |
| 2018/0026695 | A1* | 1/2018 | Johnsson | H04B 7/0619 342/368 |
| 2018/0069669 | A1* | 3/2018 | Park | H04B 7/0695 |
| 2018/0254810 | A1* | 9/2018 | Kim | H04B 7/086 |
| 2019/0223200 | A1* | 7/2019 | Huang | H04L 5/0048 |
| 2019/0253963 | A1 | 8/2019 | Kim et al. | |

FOREIGN PATENT DOCUMENTS

| | | |
|---|---|---|
| EP | 3454475 A1 | 3/2019 |
| KR | 20060012754 A | 2/2006 |
| KR | 20140057908 A | 5/2014 |
| WO | 2015194917 A1 | 12/2015 |
| WO | 2016171873 A1 | 10/2016 |

OTHER PUBLICATIONS

IEEE Standard for Information Technology—Telecommunications and Information Exchange Between Systems Loyal and Metropolitan Area Networks—Part 11: Wireless LAN Medium Access Control (MAC) and Physical Layer (PHY) Specifications, section 10.38.5 Beamforming in A-BFT, pp. 1548-1553.
IEEE Standard for Information Technology—Telecommunications and Information Exchange Between Systems Loyal and Metropolitan Area Networks—Part 11: Wireless LAN Medium Access Control (MAC) and Physical Layer (PHY) Specifications, section 9.3.1.16 Sector Sweep (SSW) Frame Format, pp. 683-684.
Cordeiro, "Specification Framework for TGay", IEEE P802.11 Wireless LANs, pp. 1-98, Nov. 2015.
Carlos Coderio, specification framework for tgac, IEEE802.11-15/01358r8, Oct. 8, 2016, total 89 pages. XP68110625.
Rob Sun et al. EDMG Capability and operation Element Channel Indications, IEEE802.11-17/0449r0, Mar. 2017. total 12 pages. XP68115567.
Rob Sun et al. EDMG Capability and operation Element Channel Indications, IEEE802.11-17/0450r0, Mar. 2017. total 5 pages. XP68115568.
Yan Xin (Huawei Technologies), A-BFT, IEEE 802.11-16/1638r0, Dec. 22, 2016. total 5 pages. 2016.
Sang G. Kim (LG Electronics) et al. 23.2 EDMG Operation Element, IEEE 802.11-16/1632r0, Dec. 12, 2016. total 2 pages. 2016.

* cited by examiner

METHODS AND SYSTEMS FOR TRANSMITTING OPERATING CHANNEL INDICATORS

CROSS-REFERENCE TO RELATED APPLICATION(S)

The present application claims the benefit of priority from U.S. Provisional Patent Application No. 62/444,118, filed Jan. 9, 2017, entitled METHODS AND SYSTEMS FOR TRANSMITTING OPERATING CHANNEL INDICATORS FOR BEACON INTERVAL COMMUNICATIONS, the contents of which are incorporated herein by reference.

TECHNICAL FIELD

Example embodiments generally relate to the field of wireless network communications.

BACKGROUND

A number of Wi-Fi protocols exist for establishing wireless personal and local area network (WPAN/WLAN) communications between devices. Some protocols involving devices with antennas require the use of complex discovery and beamforming functions to establish directional links for certain carrier frequencies; this ensures properly aligned transmitter and receiver antennas have enough antenna gains to achieve sufficient Signal to Noise Ratio (SNR) in order to meet link requirements (e.g. 'link budgets').

In some conventional systems, beamforming functions may be performed over only one designated channel. However, when there are multiple stations that require access to the network, this can result in increased probability of collisions over the channel.

Additional difficulties with existing systems may be appreciated in view of the Detailed Description of Example Embodiments, herein below.

SUMMARY

An object of at least some example embodiments is to provide a method and apparatus for transmitting operating channel indicators for access periods.

Example embodiments include a management frame from an access point (AP) or personal basic service set (PBSS) control point (PCP) that indicates which designated channels are operating and which are non-operating, for purposes of an access period Association Beamforming Training (A-BFT) or other access periods in the Beacon Interval. The management frame contains a field in bits or other forms for indicating which of the designated channels are operating and which are non-operating. In response to the information received through the management frame, one or more stations (STAs) can select any one or combinations of the operating channels for transmitting of frames in A-BFT or other access periods in the Beacon Interval.

An example embodiment is a method implemented by an access point (AP) or personal basic service set (PBSS) control point (PCP), the method comprising: generating a management frame that indicates, for a plurality of designated channels, which of the designated channels are operating and which are non-operating, the management frame having bit positions that each represent a respective designated channel, and a respective bit value of each bit position indicates the operating or the non-operating of the respective designated channel; and transmitting the management frame.

Optionally, in any of the previous examples of the method, the management frame comprises a beacon frame in Beacon Transmission Interval (BTI).

Optionally, in any of the previous examples of the method, the management frame comprises an announcement frame in Announcement Transmission Interval (ATI).

Optionally, in any of the previous examples of the method, the plurality of designated channels are designated for Beacon Interval (BI) communication.

Optionally, in any of the previous examples of the method, the plurality of designated channels are designated for association beamforming training (A-BFT) communication.

Optionally, in any of the previous examples of the method, the plurality of designated channels are designated for Data Transfer Interval (DTI) communication.

Optionally, in any of the previous examples of the method, the plurality of designated channels are designated for Sector Sweep (SSW) frames, SSW-feedback frames, short SSW frames, or feedback for short SSW frames.

Optionally, in any of the previous examples of the method, the management frame is transmitted over a single channel of the plurality of designated channels.

Optionally, in any of the previous examples of the method, the management frame is transmitted over at least two of the designated channels.

Optionally, in any of the previous examples of the method, the method further comprises, prior to said transmitting, determining which of the plurality of channels are operating and which are non-operating.

Optionally, in any of the previous examples of the method, said determining is based on channel load balancing.

Optionally, in any of the previous examples of the method, said determining is based on previous association beamforming training (A-BFT) communication.

Optionally, in any of the previous examples of the method, the method further comprises receiving, in response to the management frame, a sector sweep (SSW) frame from a station on one of the operating channels.

Optionally, in any of the previous examples of the method, for the management frame, an operating channel is indicated by a "1" bit and a non-operating channel is indicated by a "0" bit.

Optionally, in any of the previous examples of the method, the bit positions are grouped into a single octet within the management frame.

Optionally, in any of the previous examples of the method, the octet further comprises reserved bits.

Optionally, in any of the previous examples of the method, a first six bit positions of the octet each represent the respective designated channel, and a last two bit positions of the octet are reserved bits.

Optionally, in any of the previous examples of the method, a first six bit positions of the octet each represent the respective designated channel.

Optionally, in any of the previous examples of the method, said transmitting comprises broadcasting.

Another example embodiment is a method implemented by an access point (AP) or personal basic service set (PBSS) control point (PCP), the method comprising: generating a management frame comprising a frame that indicates, for a plurality of designated channels, which of the designated channels are operating and which are non-operating, said frame having one octet of bits; and transmitting the management frame.

Optionally, in any of the previous examples of the method, said one octet of bits comprises bit positions that each represent a respective designated channel, and a respective bit value of each bit position indicates the operating or the non-operating of the respective designated channel.

Optionally, in any of the previous examples of the method, the octet further comprises reserved bits.

Optionally, in any of the examples of the method, the method further includes: receiving a first sector sweep (SSW) frame sent from a first station on at least one channel of the plurality of designated channels; receiving a second SSW frame sent from a second station on at least one channel of the plurality of designated channels; and transmitting corresponding first and second sector sweep feedback (SSW-feedback) frames to the first and second stations, respectively. Optionally, in any of the examples of described methods, the first SSW-feedback frame is transmitted to the first station on one channel, and the second SSW-feedback frame is transmitted to the second station on another channel.

Another example embodiment is an access point (AP) or personal basic service set (PBSS) control point (PCP), comprising: a memory; at least one transceiver configured to communicate over a plurality of channels; and at least one processor configured to execute instructions stored in the memory to transmit a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Another example embodiment is a non-transitory computer readable medium containing instructions executable by at least one processor of an access point (AP) or personal basic service set (PBSS) control point (PCP), the instructions comprising: instructions for generating a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel; and instructions for transmitting the management frame.

Another example embodiment is a method implemented by a station, the method comprising: receiving, from an access point (AP) or personal basic service set (PBSS) control point (PCP), a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Optionally, in any of the previous examples of the method, the method further comprises selecting one or more channels from the operating channels; and transmitting a frame on the selected one or more operating channels.

Optionally, in any of the previous examples of the method, the frame is a sector sweep (SSW) frame or a short SSW frame.

Optionally, in any of the previous examples of the method, the SSW frame or the short SSW frame is transmitted during association beamforming training (A-BFT).

Optionally, in any of the previous examples of the method, the frame is transmitted during Beacon Interval (BI).

Optionally, in any of the previous examples of the method, the frame is transmitted during Data Transfer Interval (DTI).

Optionally, in any of the previous examples of the method, said selecting comprises randomly selecting said one or more channels from the operating channels.

Another example embodiment is a station, comprising: a memory; at least one transceiver configured to communicate over a plurality of channels; and at least one processor configured to execute instructions stored in the memory to receive, from an access point (AP) or personal basic service set (PBSS) control point (PCP), a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Beamforming is a wireless communication technique employed in various wireless communication protocols, for example in suitable protocols of IEEE 802.11.

BRIEF DESCRIPTION OF THE FIGURES

Embodiments will now be described by way of examples with reference to the accompanying drawings, in which like reference numerals may be used to indicate similar features, and in which.

DETAILED DESCRIPTION OF EXAMPLE EMBODIMENTS

Beamforming is a wireless communication technique employed in various Wi-Fi protocols, for example in protocol IEEE 802.11ad, due to the relatively small form factors of antenna arrays associated with the 60 GHz band. Beamforming can be performed on the transmitter side using, for example an Initiator Sector Sweep (ISS) transmit sector sweep (TXSS); or on the receiver side using, for example, a Responder Sector Sweep (RSS) Receive Sector Sweep (RXSS) or an ISS RXSS; or on both the transmitter side and the receiver side, to ensure that emissions of respective antennas are aligned to provide enough gain and to minimize interference from other devices.

Figure 1:
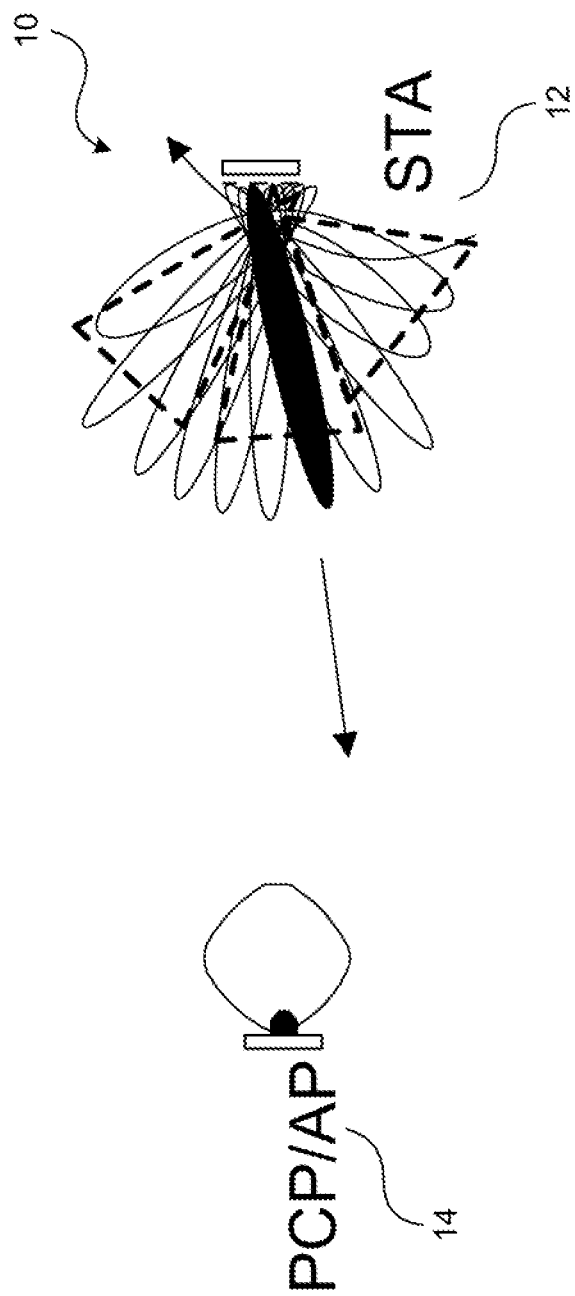
FIG. 1 illustrates responder sector sweep (RSS) beamforming between a station (STA) and a personal basic service set (PBSS) control point/access point (PCP/AP)

FIG. 1 is an example illustration of RSS beamforming 10 performed between a Station (STA) 12, such as a User Equipment (UE), phone, laptop, computer, or any device capable of using IEEE 802.11 protocol; and a personal basic service set (PBSS) control point/access point (PCP/AP) 14. The PCP/AP 14 transmits a beacon frame. The STA 12 undergoes a protocol in which it sends beamforming training frames in the form of Sector Sweep (SSW) frames or short SSW frames from one or more sectors to the PCP/AP 14 according to its distinct antenna radiation patterns. The PCP/AP 14 then responds with feedback (SSW-Feedback) that provides the STA information about the best sector and measured quality. The SSW frames and corresponding responsive SSW-Feedback frames are exchanged over a single channel between the devices (half-duplex). The STA 12 uses the information carried in SSW-Feedback to choose the best sector to use for transmitting to the PCP/AP 14 thereafter. When beamforming is performed amongst multiple STAs 12, the simultaneous transmission of SSW frames from different STAs 12 can result in collisions which can effectively delay, reduce the efficiency of, or render ineffective, the beamforming process. This problem is explained in further detail herein below.

Figure 2:
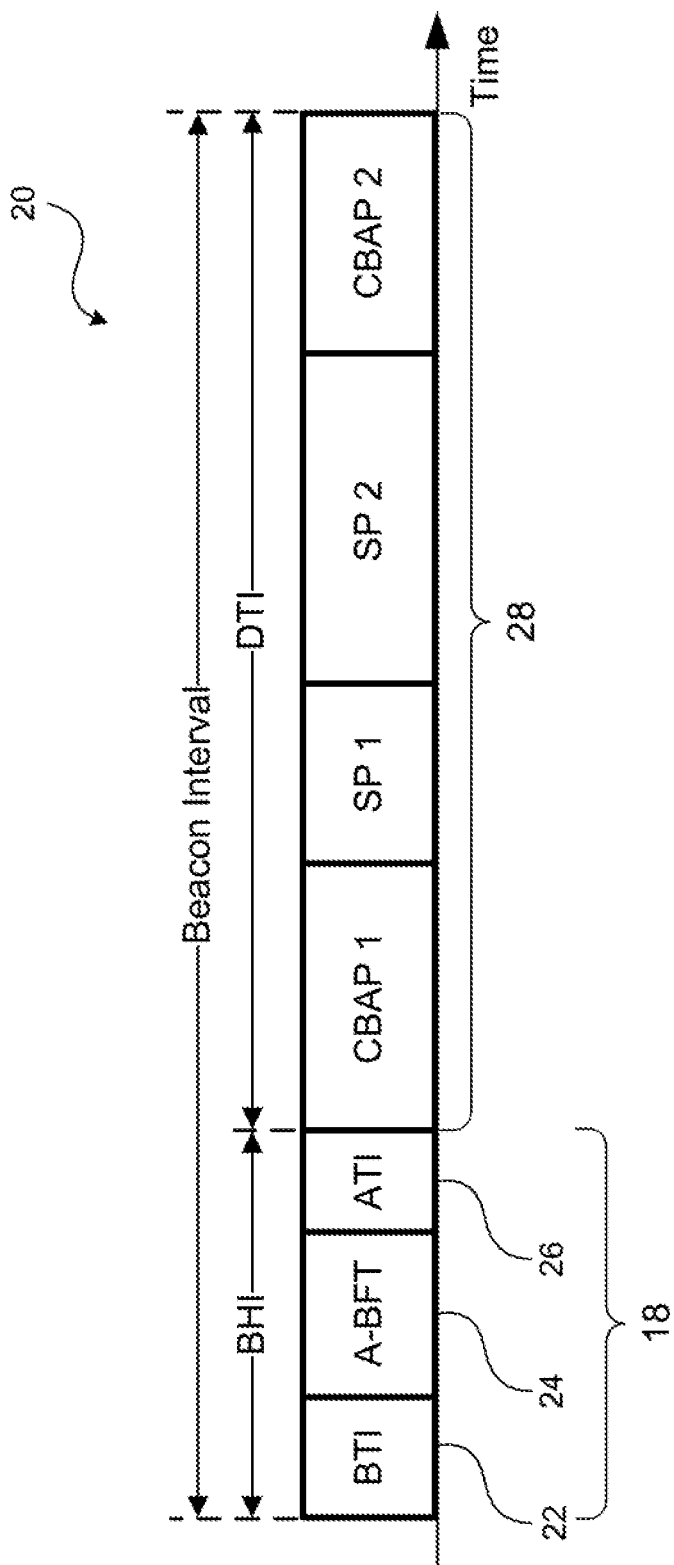
FIG. 2 is an example access period within a Beacon Interval.

FIG. 2 is an example channel access period within a Beacon Interval 20, which illustrates the signaling structure used for gaining access to a channel under certain Wi-Fi protocols. As shown, the Beacon Interval 20 comprises Beacon Header Interval (BHI) 18 and Data Transfer Interval (DTI) 28. The BHI 18 comprises: Beacon Transmission Interval (BTI) 22, Association Beamforming Training (A-BFT) Interval 24, Announcement Transmission Interval (ATI) 26. The BHI 18 facilitates the exchange of management information and network announcements using a sweep of multiple directionally transmitted frames. The BHI 18 and DTI 28 are generally used for establishing channel access for transmission of Beacon frames, control frames, management frames and data frames as well as for beamforming performed between a PCP/AP 14 and an STA 12.

As shown in FIG. 2, a Beacon Transmission Interval (BTI) 22 is an access period during which one or more Directional Multi Gigabit (DMG) Beacon frames are transmitted. In BTI, a DMG PCP/AP can perform Sector Level Sweep (SLS) beamforming and broadcast information in a DMG Beacon. An Association Beamforming Training (A-BFT) Interval 24 is an access period during which SLS beamforming training is performed with the PCP/AP having transmitted a DMG Beacon frame in a preceding BTI. Transmitted frames in A-BFT include SSW, SSW-feedback frames, short SSW frames and feedback for short SSW frames. An Announcement Transmission Interval (ATI) 26 is an access period during which management information is exchanged between PCP/AP and non-PCP/non-AP STAs. Transmitted frames in ATI may include management frames, e.g., Information Request/Response, Association request/response, Grant frames, etc. The DTI 28 is an access period during which frame exchanges are performed between PCP/AP and STAs or between STAs. There is a single DTI per beacon interval. The DTI further comprises one or more scheduled service periods (SP 1, SP 2), and/or a contention-based access period (CBAP1, CBAP 2).

Figure 3:
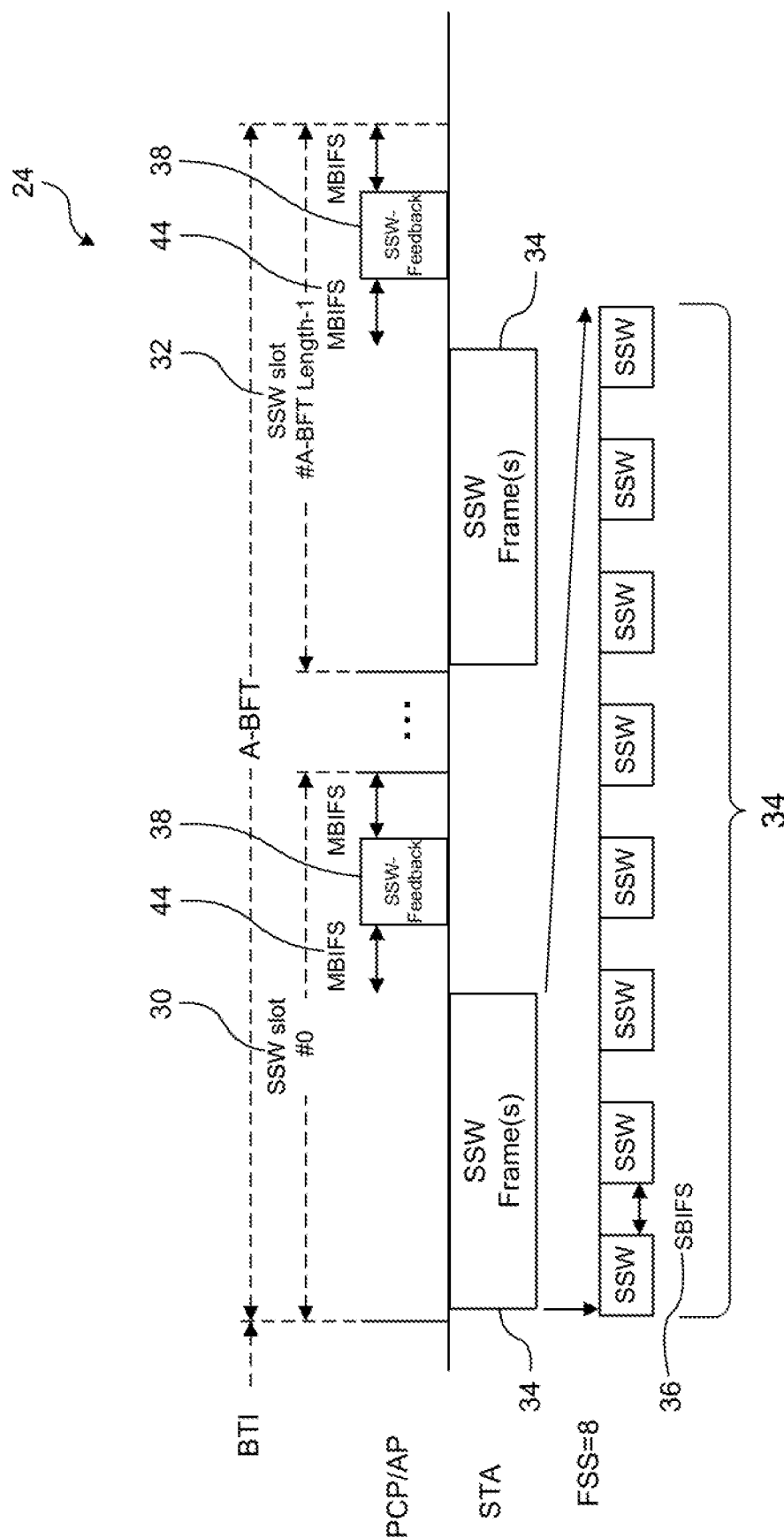
FIG. 3 is an example timing diagram illustrating the operations that occurs during an A-BFT period.
Figure 4:
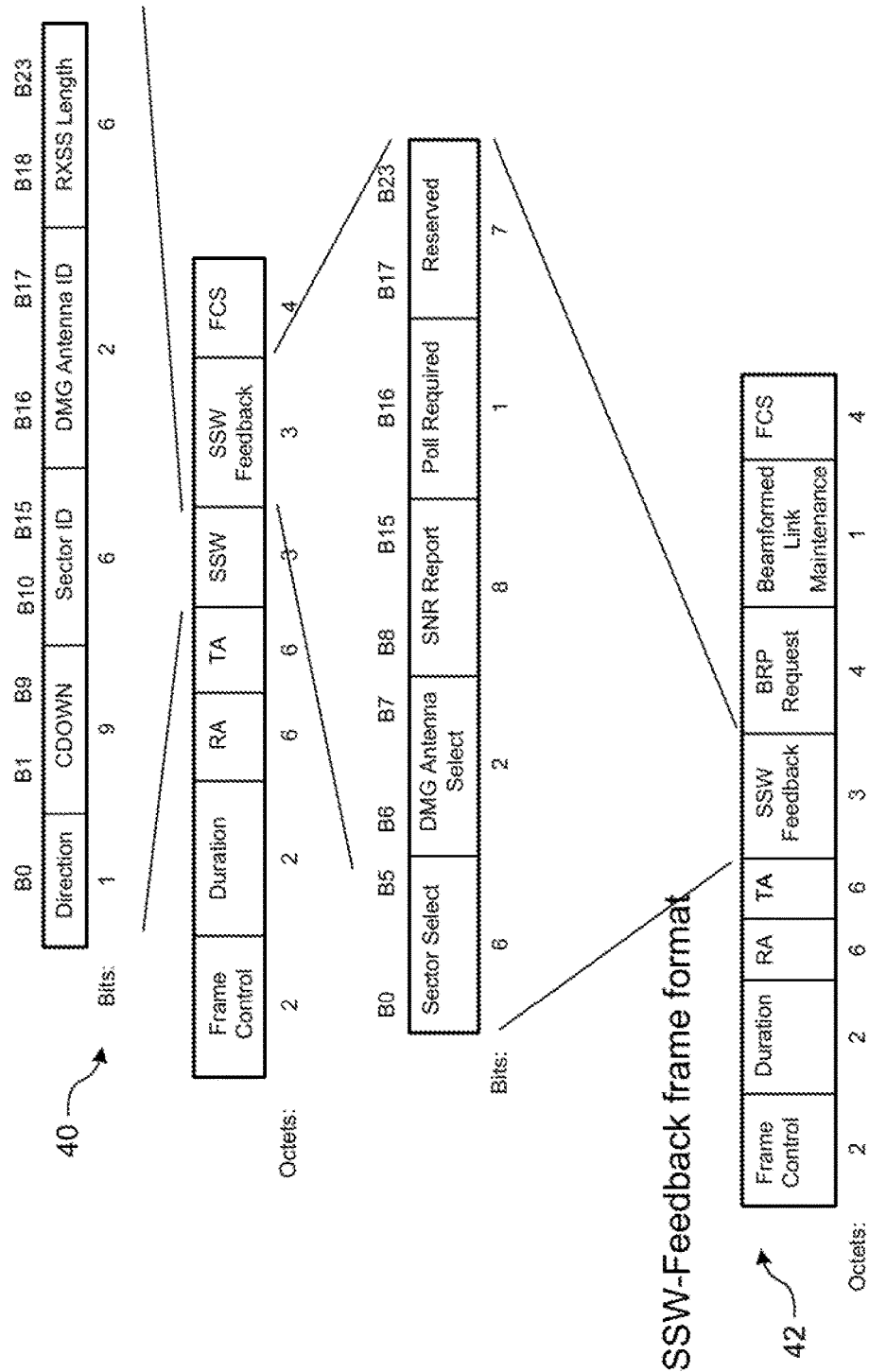
FIG. 4 illustrates example frame formats for Sector Sweep (SSW) and Sector Sweep-Feedback (SSW-Feedback) frames that may be used under certain Wi-Fi protocols.

Beamforming performed during the A-BFT Interval 24 of the beacon interval under various Wi-Fi protocols is further sub-divided into the intervals described below. Referring to FIG. 3, there is shown an example timing diagram illustrating the signaling that occurs during an A-BFT Interval 24. The A-BFT Interval 24 is sub-divided into multiple SSW slots (e.g., SSW slot #0 (30), to SSW slot # A-BFT Length-1 (32), in FIG. 3), each of which can be selected by a single STA for performing Responder Sector Sweep (RSS) with the PCP/AP. The RSS is performed by the STA sending SSW frames to the PCP/AP, and the PCP/AP replying with an SSW-Feedback frame back to the STA. FIG. 4 illustrates example frame formats for both an SSW frame 40, and an SSW-Feedback frame 42, that may be used under certain Wi-Fi protocols.

Typically, one or more SSW frames 34 are sent within an SSW slot period separated by short beamforming inter-frame space (SBIFS) 36. Each SSW frame 34 corresponds to a sector of the STA's antenna radiation direction. Referring back to FIG. 1, for example, the STA 12 can set the Sector ID and the DMG Antenna ID fields for each SSW frame to a value that uniquely identifies a specific sector. The PCP/AP 14 receives each SSW frame using a quasi-omni antenna pattern, and determines the Sector ID and DMG Antenna ID field having the best quality. The PCP/AP 14 then sends an SSW-Feedback frame 38 back to the STA 12 with this information, following a medium beamforming inter-frame space (MBIFS) 44 period after the last SSW frame within the same SSW slot. The STA 12 can then select the Sector ID and the DMG Antenna ID having the best quality for future transmissions.

Figure 5:
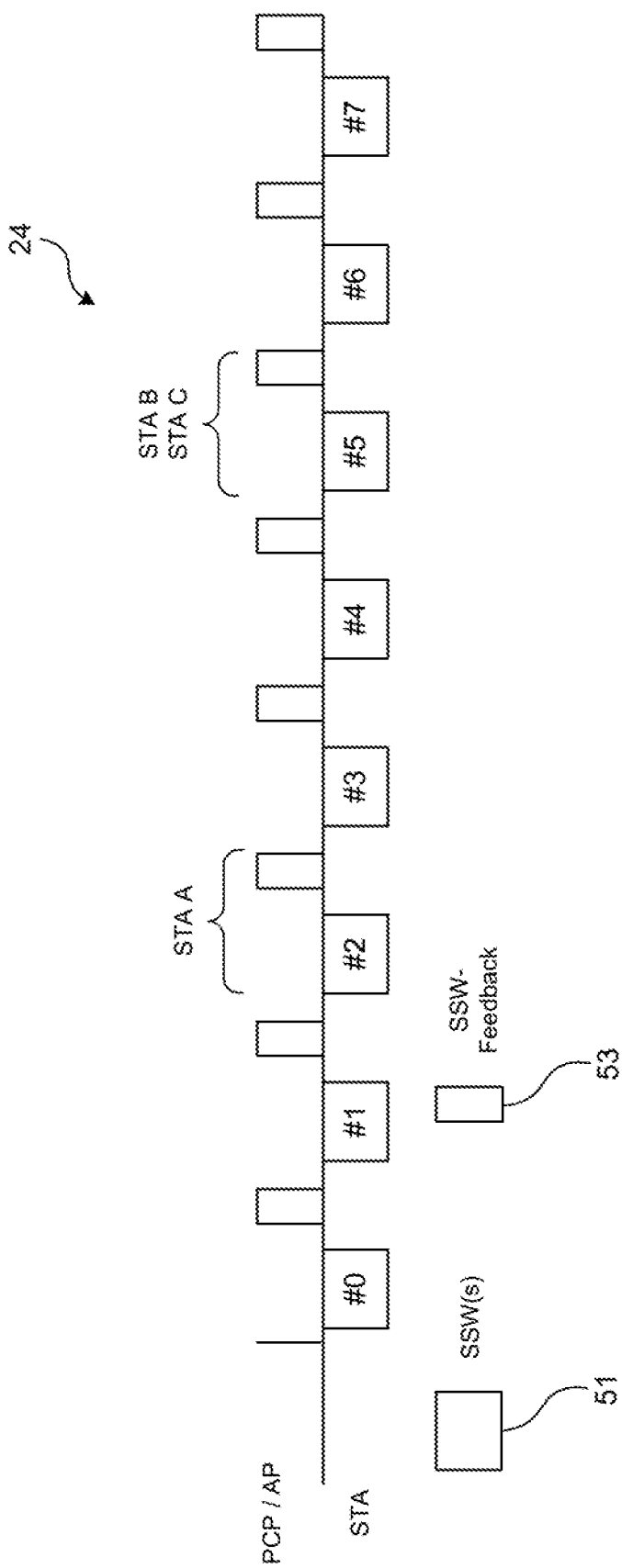
FIG. 5 illustrates an example of an Association Beamforming Training (A-BFT) procedure between three STAs in an A-BFT period.

However, when multiple STAs wish to perform RSS during an A-BFT Interval, the possibility of two or more STAs selecting the same SSW slot arises, resulting in the potential for SSW slot collisions. This is illustrated in FIG. 5, which illustrates an example timing diagram of an A-BFT Interval 24 comprising 8 SSW slots (Slot #0-7). The A-BFT Interval 24 begins through a random backoff procedure. STAs may select SSW slots 51 from a uniform distribution ([0, A-BFT Length-1]). For example, three DMG STAs (STA A, STA B, STA C) receive DMG Beacon frames from a PCP/AP including Beacon Interval Control field ("isResponderTXSS=1", "A-BFT Length=8" and "FSS=8"). The three STAs then compete for access by randomly selecting SSW slots (within [0, 7]), where each SSW slot allows for transmission of 8 SSW frames. Because STA A is the only device to choose SSW slot #2, there is no collision in that slot. However, because STA B and STA C both choose SSW slot #5, there is a resulting collision in that slot.

SSW slot collisions cause the erroneous reception of collided SSW frames sent from STAs to the PCP/AP. Under certain Wi-Fi protocols, the PCP/AP responds with an SSW-Feedback frame 53 before the end of each SSW slot (buffered by an MBIFS interval). The STA will have its receiving antenna array configured to a quasi-omni antenna pattern to receive the SSW-Feedback from the PCP/AP. The SSW-Feedback frame is transmitted through the sector identified by the received value of the Sector Select field and DMG Antenna Select field included in the SSW frames sent by the STA in the SSW slot, and contains information based on the SSW frames received within the same SSW slot. Accordingly, if two or more STAs select the same SSW slot (such as STA B and STA C both selecting slot #5 in FIG. 3, for example), the STAs may not correctly detect the SSW-Feedback sent from the PCP/AP.

Figure 6:
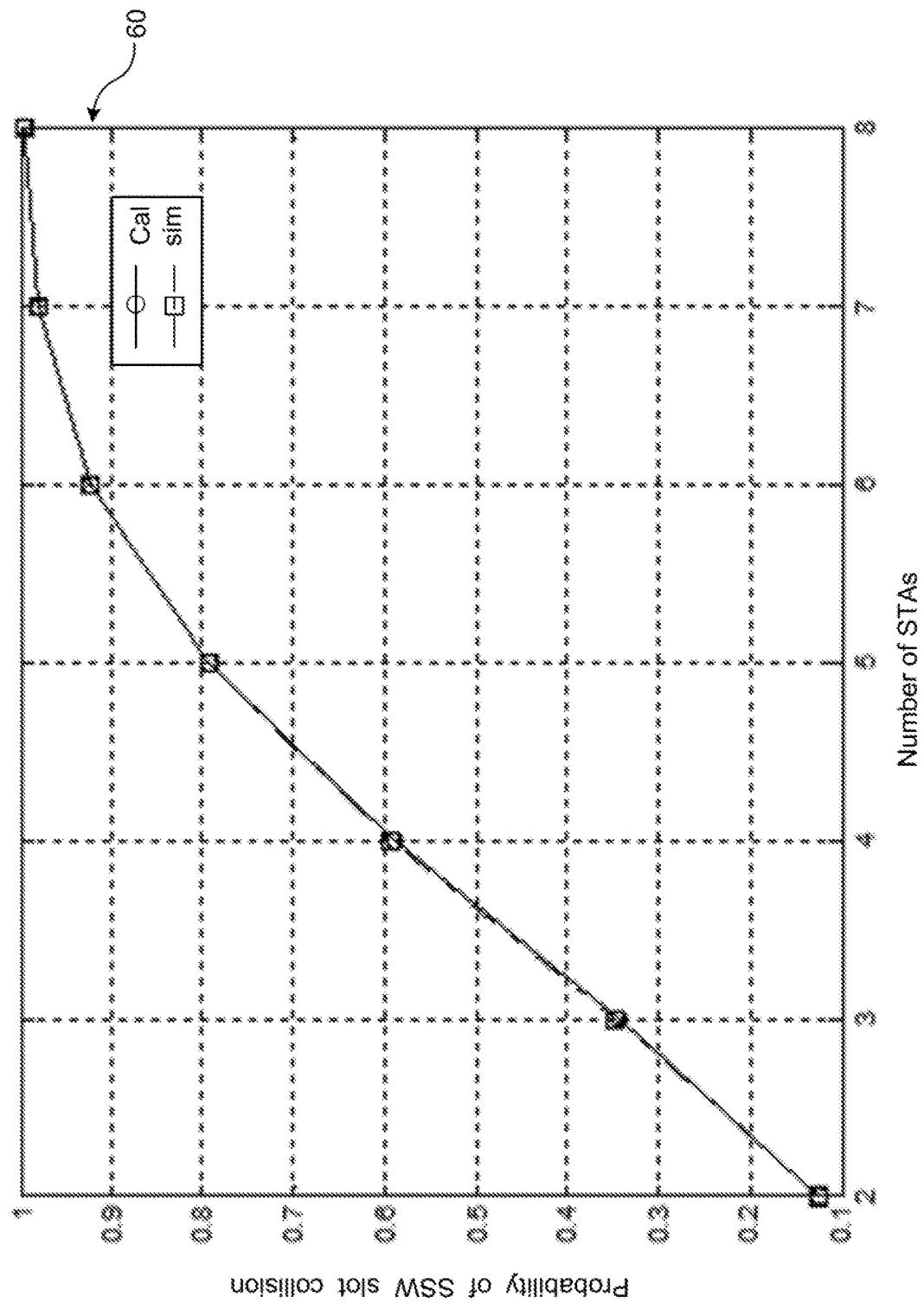
FIG. 6 is an example graph illustrating the probability of SSW slot collisions vs. the number of STAs when performing RSS with a PCP/AP with an assumption of eight SSW slots allocated in A-BFT.

FIG. 6 is an example graph 60 illustrating the probability of SSW slot collisions vs. the number of STAs when performing RSS with a PCP/AP. In this example, there is a maximum of 8 SSW slots during the A-BFT Interval. Because DMG basic service sets (BSS) operate on a single channel, multiple STAs that have received Beacon frames must contend with each other to acquire SSW slots within the A-BFT Interval to perform RSS. As shown in FIG. 6, the likelihood of SSW slot collisions increases with the number of STAs competing for channel access to perform RSS with the PCP/AP.

For example, based on the random backoff procedures for A-BFT according to 802.11ad, the probability of SSW slot collision as shown in FIG. 6 can be calculated as:

$$p = 1 - \frac{\binom{L-1}{m-1} \cdot (m-1)!}{L^{(m-1)}}$$

where L is the number of SSW slots in an A-BFT Interval, and m is the number of STAs that are competing for channel access.

Accordingly, an object of at least some example embodiments is to reduce the probability of SSW slot collisions, for example, when there are multiple STAs competing for channel access during an A-BFT Interval when performing RSS with a PCP/AP. This may be accomplished through use of a bitmap to indicate operating status of different communication channels, that can be consistently and readily implemented without unnecessary complexity. In this way, SSW and SSW-Feedback frames can be selectively transmitted through an available communication channel between a PCP/AP and multiple STAs, while reducing the probability of SSW slot collisions.

Figure 7A:
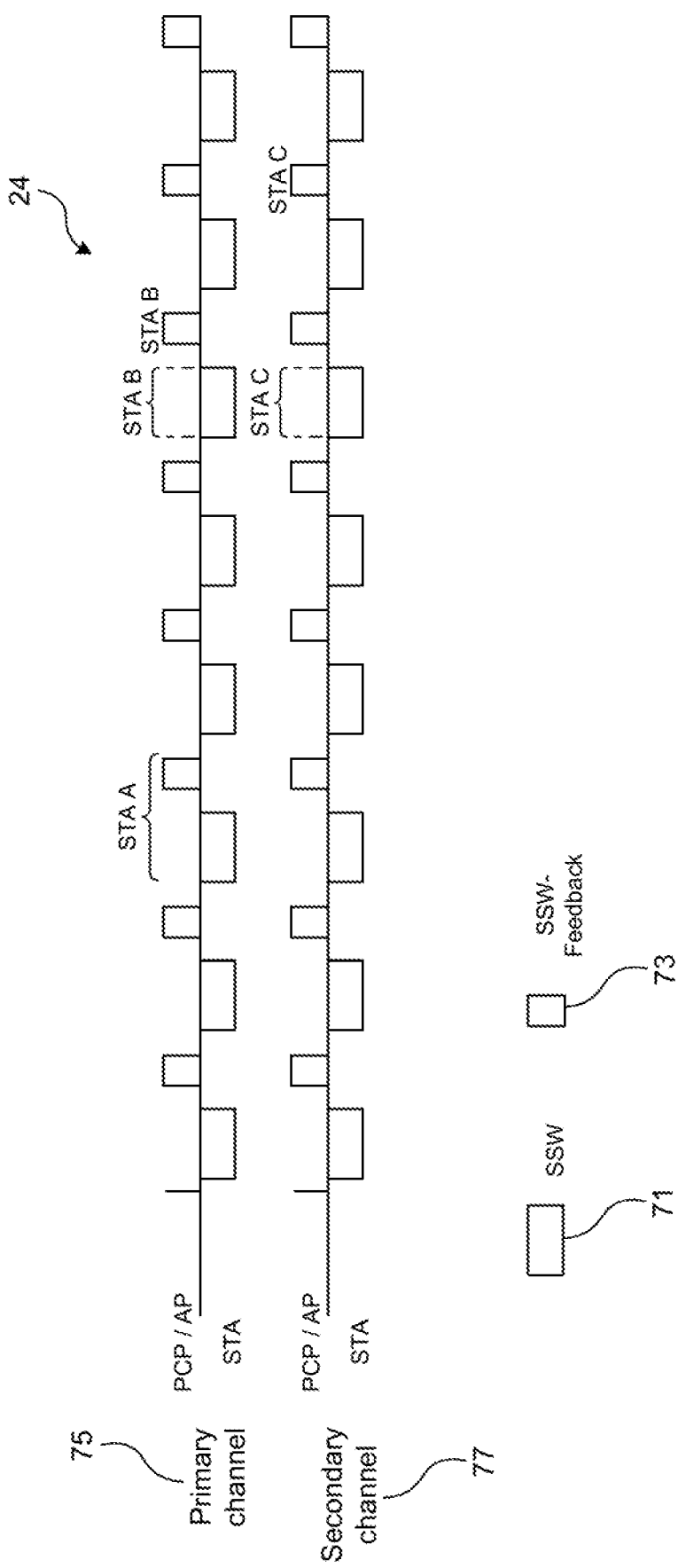
FIGS. 7A and 7B illustrate A-BFT procedures between three STAs performed over two channels, according to example embodiments.
Figure 7B:
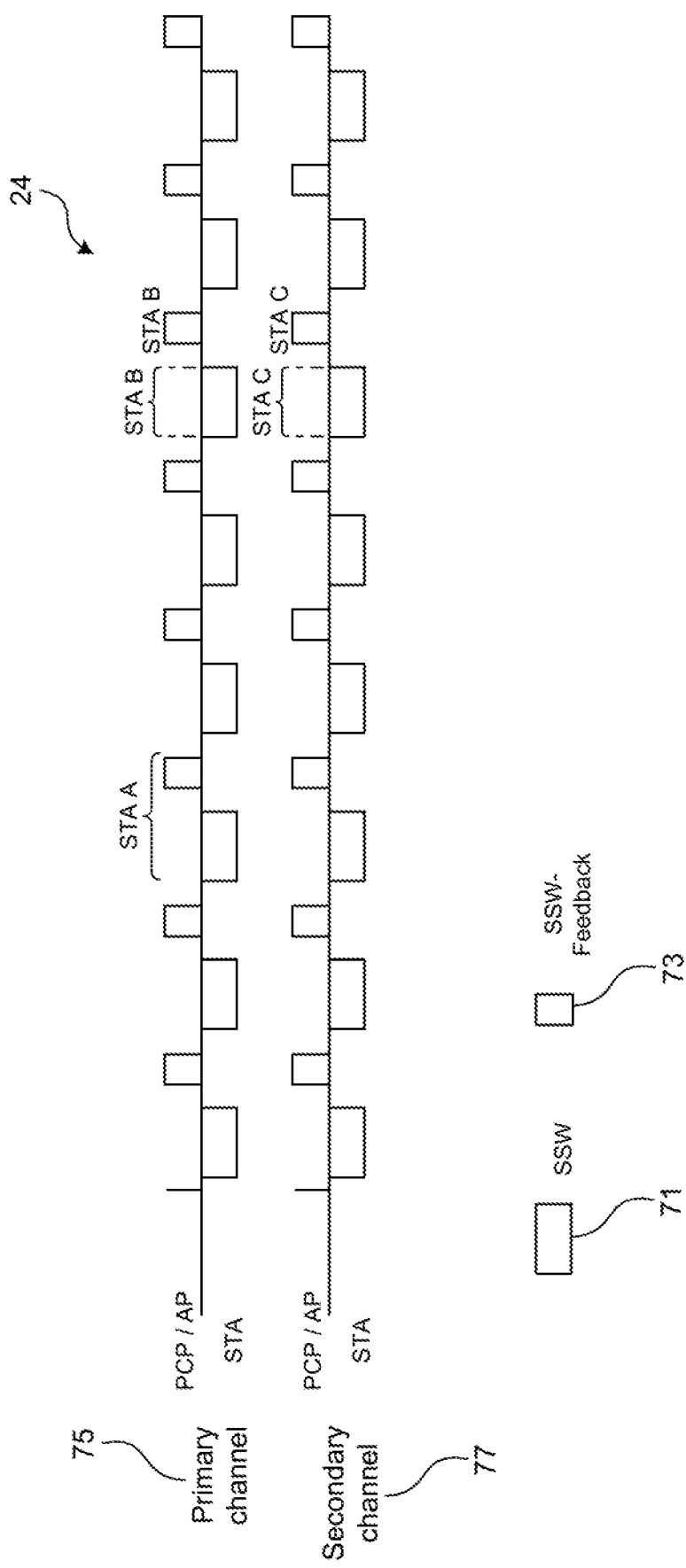

FIGS. 7A and 7B each show an A-BFT Interval 24 illustrating A-BFT operation according to example embodiments. Referring to FIG. 7A, the transmissions (e.g. SSW, SSW-Feedback frames 71, 73) during the A-BFT Interval 24 of FIG. 7A are similar to those of the A-BFT Interval in FIG. 5, except that the transmissions are performed over a plurality of channels between the STAs and the PCP/AP. For example, in certain Wi-Fi protocols, such as that proposed in future variations of IEEE 802.11, such as IEEE 802.11ay, STAs and PCP/APs may be Evolved Directional Multi Gigabit (EDMG) devices that are configured to communicate over multiple channels. EDMG STAs and EDMG PCP/APs may accordingly permit the exchange of SSW frames and SSW-Feedback frames, as well as short SSW frames and feedback for short SSW frames, over multiple channels during an A-BFT Interval.

In certain embodiments comprising EDMG BSS, such as those that may be implemented in future variations of IEEE 802.11 standards, such as IEEE 802.11ay, an EDMG PCP/AP and EDMG STAs can exchange SSW frames and SSW Feedback frames over a first (e.g. primary) channel 75 or a second (e.g. secondary) channel 77 (for example having a bandwidth of 2.16 GHz). In contrast, conventional DMG STAs may only perform A-BFT over a single channel. In certain embodiments, the first channel may be indicated by the EDMG PCP/AP in a Beacon. The first channel can be referred to as the primary channel that is originally used to send the Beacon, and subsequent communication can be performed over the primary channel or one or more secondary channels. During A-BFT, EDMG devices (for example, those that may support future proposals for IEEE 802.11) may choose to operate on the plural channels rather than being limited to a single channel.

In certain embodiments, that may follow future proposals for the IEEE 802.11 standard for example, such as IEEE 802.11ay, the random backoff procedure may comprise an EDMG STA selecting a SSW slot # from a uniform distribution (e.g. [0, L] where L is an integer equal to or less than A-BFT Length-1). In an example embodiment, the EDMG STA can also randomly select one of the available channels.

In certain embodiments, that may follow future proposals for the IEEE 802.11 standard for example, such as IEEE 802.11ay, the EDMG PCP/AP can send a corresponding SSW-Feedback frame to an EDMG STA within the same SSW slot, or in the next available SSW slot. In some embodiments, the next available SSW slot might only include the SSW Feedback frame.

In certain embodiments, if the PCP/AP receives at least one SSW frame from a STA, but is unable to transmit an SSW-Feedback frame to that STA within the same A-BFT Interval, the PCP/AP may schedule a later time during DTI for the STA to complete RSS, or may transmit the SSW-Feedback frame during the next available A-BFT Interval.

Referring back to FIG. 7A, an embodiment of A-BFT operation between three STAs (STA A, STA B, STA C) and a PCP/AP will now be described. The PCP/AP can announce the number of SSW slots and the number of SSW frames in each SSW slot in the A-BFT Interval, for example, in an A-BFT Length subfield (3-bit) and/or FSS subfield (4-bit) of the Beacon Interval Control field in DMG Beacon, over a first (e.g. primary) and a second (e.g. secondary) channel. Using a random backoff procedure, STAs then randomly choose a slot and a channel. As shown, STA A chooses SSW slot #2 of the first channel, and STA B and STA C both choose slot #5, on the first and second channels respectively. Although the concurrent selection of slot #5 by STA B and STA C would normally result in an SSW slot collision, random channel selection allows them to perform RSS over separate channels, resulting in an orthogonal transmission scheme for distinguishing SSW/SSW-Feedback frames from/to STA B and STA C to thereby avoid/reduce any collision. As shown in FIG. 7A, the PCP/AP simultaneously receives SSW frames from STA B and STA C over the first and second channels, and decodes them accordingly. The PCP/AP then sends the corresponding SSW-Feedback frame to STA B over the first channel in the same SSW slot (slot #5), and subsequently sends the corresponding SSW-Feedback for STA C over the second channel in the next available SSW slot (e.g., #6) if the best transmit antenna sectors of the PCP/AP to STA B and STA C are different and the PCP/AP uses one antenna to transmit SSW-Feedback.

Referring to FIG. 7B, there is shown another embodiment of an A-BFT operation between three STAs (STA A, STA B, STA C) and a PCP/AP similar to that shown in FIG. 7A, except in that the PCP/AP alternatively sends SSW-Feedback frames to STA B and STA C in the same SSW slot (slot #5). However, because the SSW-Feedback frames for STA B and STA C are still transmitted over different channels (e.g. an orthogonal transmission scheme through channel variation), they remain distinguishable by the STAs and their coincidence in the same SSW slot (slot #5) does not result in a collision. The transmission may be performed even in situations where STA B and STA C are adjacent or co-located in space or where STA B and STA C are covered by the same best PCP/AP Tx antenna sector, and the PCP/AP has multi-antenna capability to transmit SSW-Feedback frames simultaneously through multiple antennas.

Figure 8:
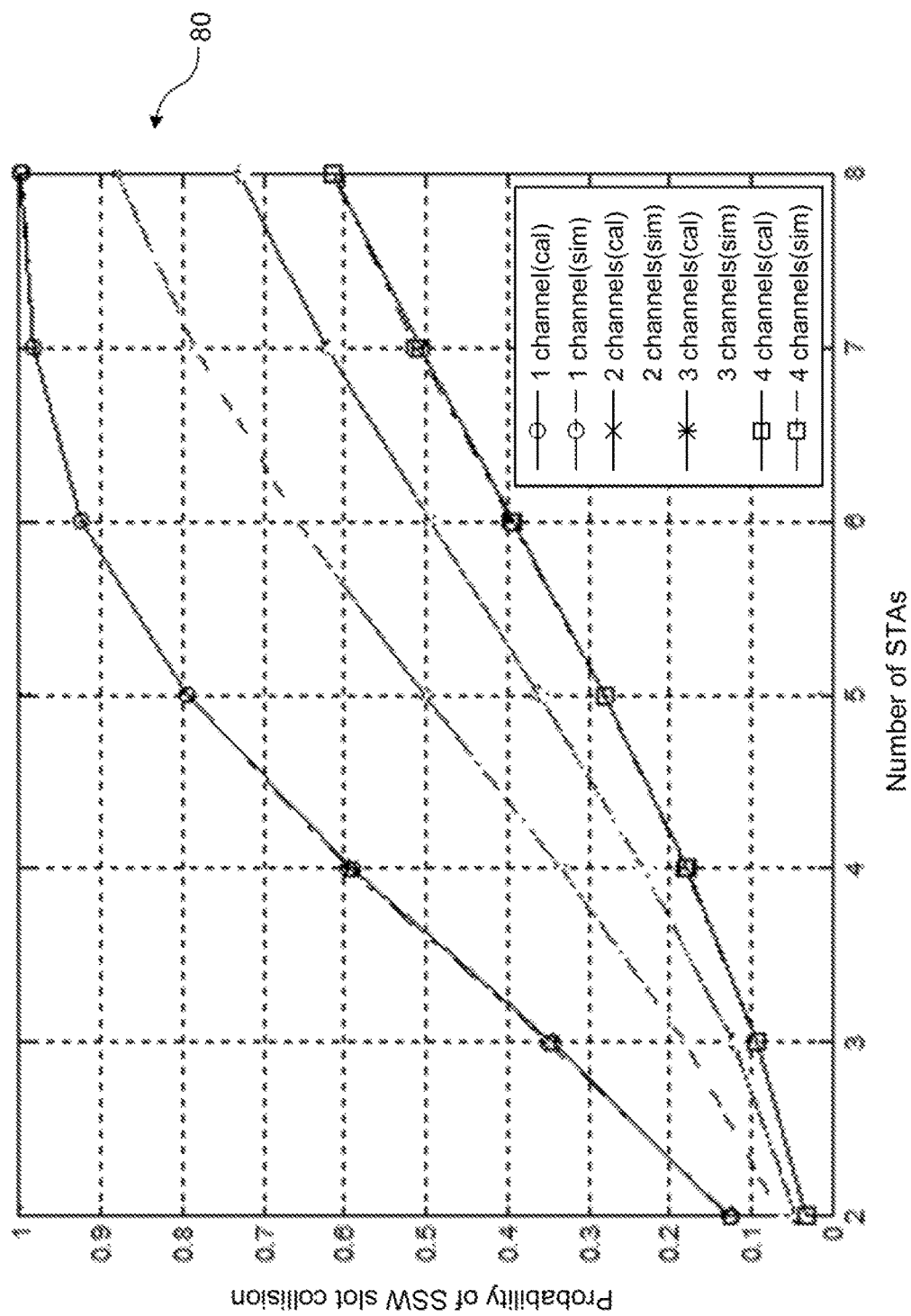
FIG. 8 is an example graph illustrating the probability of SSW slot collisions vs. the number of STAs when performed over different numbers of channels with an assumption of eight SSW slots allocated in A-BFT, according to example embodiments.

FIG. 8 is a graph 80 illustrating the probability of SSW slot collisions vs. the number of STAs when performing RSS using the A-BFT procedure illustrated in FIG. 7A above, according to example embodiments. In FIG. 8, the solid lines represent the calculated ("cal") probabilities, and the dashed lines represent the simulated ("sim") probabilities for A-BFT performed over 1, 2, 3, and 4 available channels. As clearly indicated, the probability of SSW slot collisions is greatly reduced as the number of available channels increases.

Figure 9:
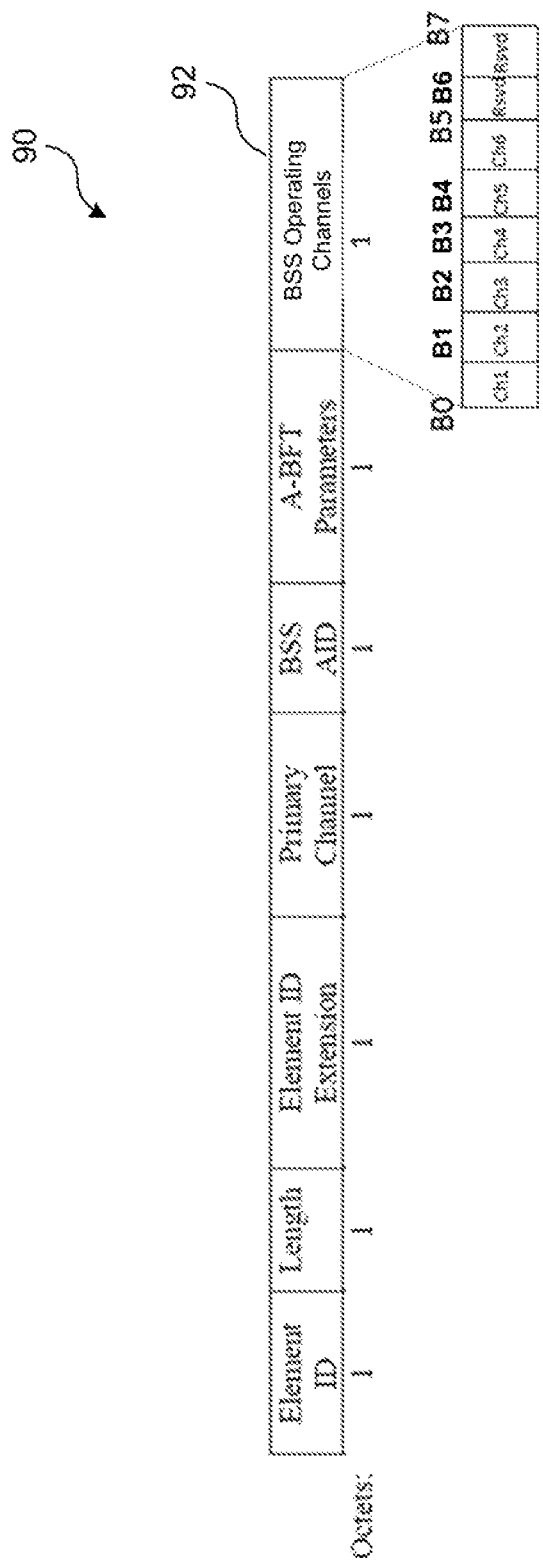
FIG. 9 illustrates an Evolved Directional Multi Gigabit (EDMG) operation element field format, according to example embodiments.

FIG. 9 illustrates an Evolved Directional Multi Gigabit (EDMG) operation element 90 field format that is to be broadcast from the PCP/AP, according to example embodiments. In some example embodiments, the handling of multiple STAs can be facilitated using multiple channels, by way of operating channel availability announcement from the PCP/AP and corresponding channel selection and communication from an STA.

The operational parameters of an EDMG BSS provided by the AP/PCP are defined by the EDMG Operation element 90. The EDMG Operation element 90 is transmitted as a management frame, such as a beacon frame in the Beacon Transmission Interval (BTI) 22 (FIG. 2). Other example management frames include an announcement frame in ATI, or other management frames.

Each designated channel can, for example, have a bandwidth of 2.16 GHz. The particular maximum number of designated channels may vary depending on the particular jurisdiction or defining body. In example embodiments, the BSS Operating Channels field 92 is used to indicate which of the plurality of designated BSS channels of the AP/PCP are operating or non-operating. Operating channel in these example embodiments refers to the designated channel being available for A-BFT communication, wireless communication, or Beacon Interval communication, and non-operating channel in these example embodiments refers to the designated channel being unavailable for A-BFT communication, wireless communication or Beacon Interval communication.

In some example embodiments, the BSS Operating Channels field 92 is 1 octet (8 bits), for consistency and reduced complexity of implementation with the other fields that are also 1 octet. The BSS Operating Channels field 92 contains a bitmap for the operating channels corresponding to the single channel numeration of the channelization. For example, for the relevant portion of the bitmap, each bit position represents a designated channel. For example, as shown in FIG. 9, B0 to B5 are the channel bits for channel 1 to channel 6. The operating channels are indicated with a bit value of "1", the non-operating channel are indicated with a bit value of "0". B6 and B7 are reserved bits and they are preset as "0"s, in an example embodiment. B0 to B5 are the first six bit positions of the octet, and B6 to B7 are the last two bit positions of the octet. For example, if BSS Operating Channels field is =110110000, it means the PCP/AP determines that the EDMG STAs could use the channels of 1, 2, 4 and 5 for the subsequent channel access.

The BSS Operating Channels field 92 denotes the channels which are determined by the PCP/AP that can be used for multi-channel operations, e.g. for Beacon Interval communications such as A-BFT, ATI and DTI in multi-channel access. The bitmap in the BSS Operating Channels field 92 may be changed from one Beacon Interval to the next.

An operation channel bandwidth can be calculated correspondingly, e.g. BW=n×2.16 GHz, wherein n denotes the maximum number of bonded operating channels (maximum number of consecutive "1"s) within the BSS Operating Channels field 92.

In some example embodiments, the reserved bit positions of the bitmap can be used for channel availability indication of up to two more channels, as more channels become authorized. In some example embodiments, the reserved bit positions can be used to communicate other information.

In an example embodiment, the EDMG Operation element 90 is transmitted (e.g. broadcast) over a single channel, which can be referred to as the primary channel. Responsive SSW frame(s) from an STA can be received over one of the channels that were indicated as being an operating channel (which can include the originally used channel such as the primary channel).

In another example embodiment, the EDMG Operation element 90 is broadcast over at least some or all of the operating channels (including the primary channel), and responsive SSW frame(s) from an STA can be received over any one of the channels that were indicated as being an operating channel.

In an example embodiment, the operating or non-operating of a designated channel can be determined by the AP/PCP based on specified criteria (e.g. rules stored in memory of the AP/PCP), which can then be transmitted as the bitmap. A designated channel can be indicated as being operating as a default, in an example embodiment, unless the specified criteria are determined by the AP/PCP so as to indicate the channel as non-operating. In an example embodiment, a channel can be determined to be non-operating when the channel is occupied by a specified maximum number of STAs (either currently or in a just-past Beacon Interval). In an example embodiment, a channel can be determined to be non-operating in order to maintain a relatively equal distribution of STAs in each channel, for load balancing, etc. In an example embodiment, a channel can be determined to be non-operating when one STA takes control of an operating channel. Such a STA may be reserving the channel for A-BFT or for other purposes such as data content traffic. In an example embodiment, a channel is non-operating when the AP/PCP is performing testing, calibrating, etc. In an alternate example embodiment, a designated channel can be indicated as being non-operating as a default, unless specified criteria are determined by the AP/PCP so as to indicate the channel as operating.

Still referring to the EDMG Operation element 90, in example embodiments, there is an Element ID field, a Length field, and an Element ID Extension field. The Primary Channel number field indicates the channel number of the primary channel of the BSS. The BSS AID field contains a value assigned by an AP/PCP to identify the BSS. The A-BFT Parameters field can include parameters such as RSS retry limit, and RSS backoff that a STA uses when the consecutive number of failed attempts to access the A-BFT of the BSS exceeds the retry limit. In some example embodiments, each of the fields in the EDMG Operation element 90 can each be exactly 1 octet (8 bits) for reduced complexity of implementation and other benefits of implementation uniformity.

In example embodiments, a STA which receives the EDMG Operation element 90 is now informed as to which of the plurality of designated channels are operating (and non-operating), and can be configured to send a SSW frame or short SSW frame over one of the operating channels. In an example embodiment, the operating channel is selected using random channel selection. This reduces occurrences of collision when there are multiple STAs because a number of channels can be used. Note that, in some example embodiments, when a same designated channel is selected by multiple STAs, further sharing schemes can be implemented over that channel, such as slot selection and/or other methods.

Figure 10A:
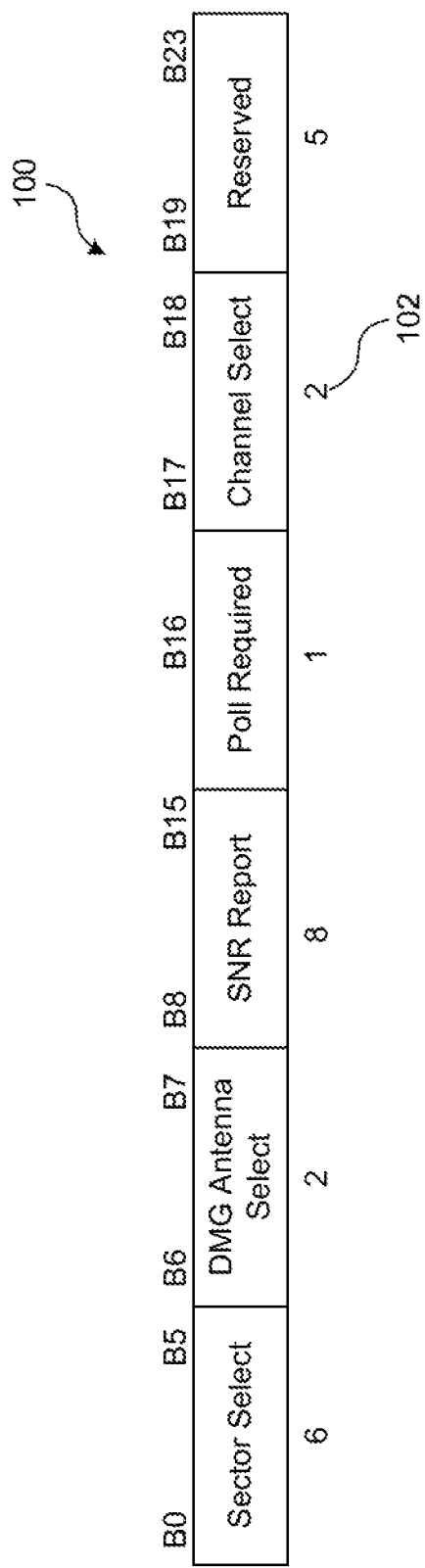
FIG. 10A is a Sector Sweep Feedback field format in SSW/SSW-Feedback frames comprising a 2-bit Channel Select subfield, according to example embodiments.
Figure 10B:
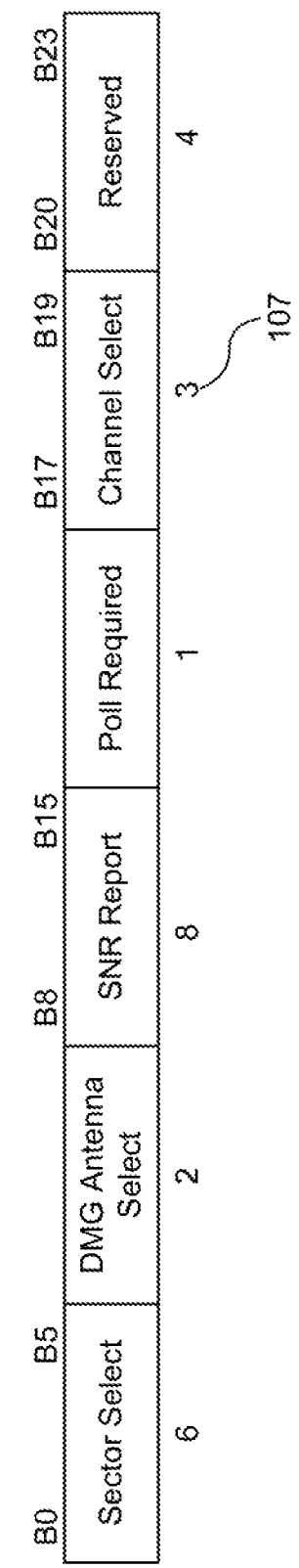
FIG. 10B is a Sector Sweep Feedback field format in for SSW/SSW-Feedback frames comprising a 3-bit Channel Select subfield, according to example embodiments.

FIGS. 10A and 10B illustrate Sector Sweep Feedback field formats 100, 105 that may be used for SSW and SSW-Feedback frames, according to example embodiments. For example, these Sector Sweep Feedback field formats may be implemented for transmitting SSW frames over a plurality of channels and sector directions to perform channel-dependent RSS in various embodiments. As shown, the Sector Sweep Feedback field formats each contain a Channel Select subfield which may be used to indicate selected channels for particular sectors.

For example, during an A-BFT Interval, an EDMG STA can use the above Sector Sweep Feedback fields to provide certain information to the PCP/AP in an SSW frame; this includes using the Sector Select, DMG Antenna Select, and Channel Select subfields to provide corresponding information. A PCP/AP can similarly also use the Sector Sweep Feedback fields above, including Selector Select, DMG Antenna Select, and Channel Select subfields, to provide corresponding information to an STA in an SSW-Feedback frame.

In some example embodiments, SSW/SSW-Feedback frame structures may include a 7 bit reserved field, where some or all of the bits may be allocated to a Channel Select subfield to indicate a selected channel for a particular sector. In the embodiment of FIG. 10A, 2 bits are allocated for the Channel Select subfield 102, which allows for the selection of up to 4 channels to meet current channelization protocols in the 60 GHz band. In the embodiment of FIG. 10B, 3 bits are allocated for the Channel Select subfield 107, to allow for the selection of up to 8 channels to accommodate future channelization protocols in the 60 GHz band or other bands. In other example embodiments, more or less bits may be allocated to select the appropriate number of designated channels (e.g. depending on the maximum number of channels).

In an example embodiment, each of the SSW frames transmitted from a STA in a Beacon Interval is not necessarily limited to one particular channel, but rather different SSW frames can be sent by the STA on different operating channels. For example, each SSW frame in a series of SSW frames can be sent on the same or different operating channels. Further, in an example embodiment, the same SSW frame may be transmitted by a STA on parallel operating channels. In an example embodiment, a responsive SSW-Feedback frame to a specific SSW frame is then typically sent over the same channel as that SSW frame (half-duplex).

Figure 11:
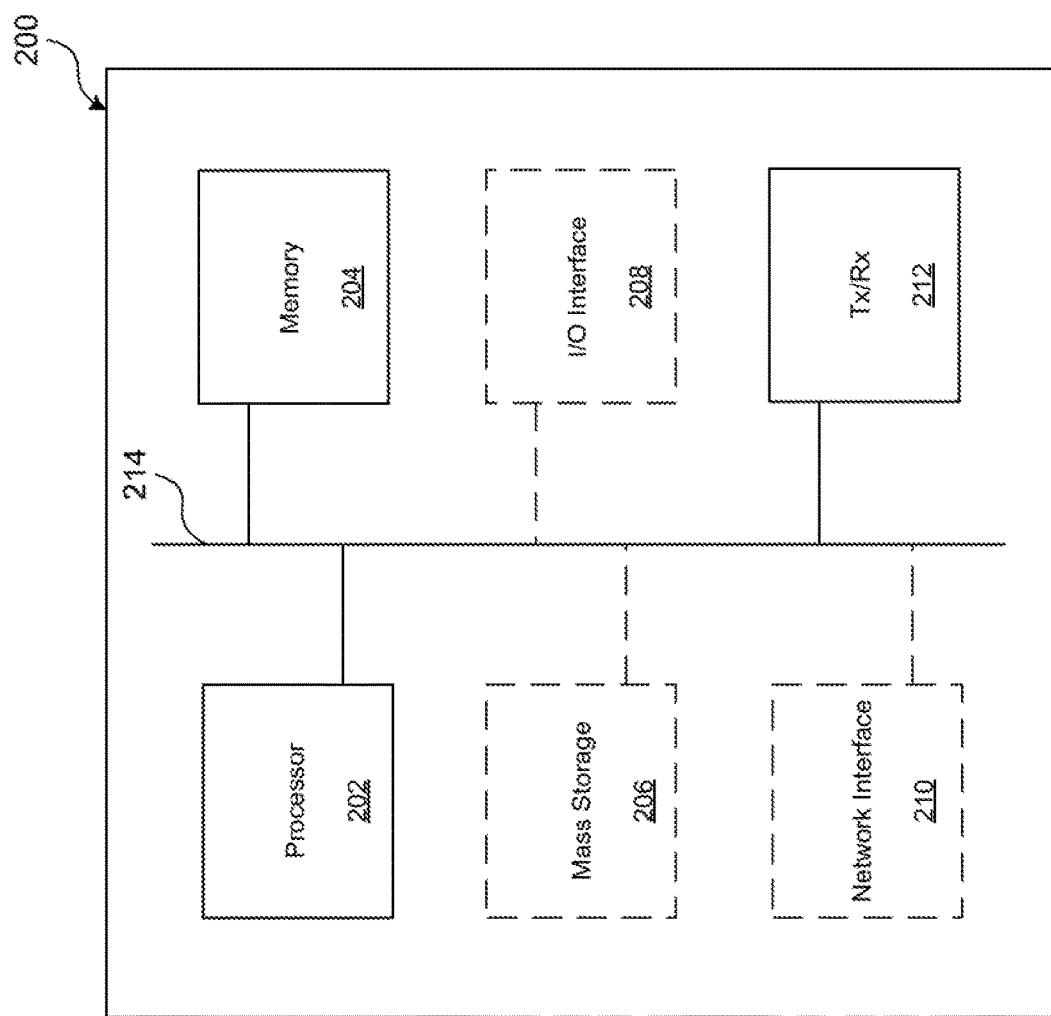
FIG. 11 illustrates an example embodiment of a hardware device that may comprise the PCP/AP or STA, according to example embodiments.

FIG. 11 is schematic diagram of a hardware device 200 that may be implemented in an Access Point (AP) such as the PCP/AP 14, or a STA 12, according to example embodiments. As shown, the hardware device includes a processor 202, memory 204, non-transitory mass storage 206, I/O interface 208, network interface 210, and a transceiver 212, all of which are communicatively coupled via bi-directional bus 214. According to certain embodiments, any or all of the depicted elements may be utilized, or only a subset of the elements. Further, the hardware device may contain multiple instances of certain elements, such as multiple processors, memories, or transceivers. Also, elements of the hardware device may be directly coupled to other elements without the bi-directional bus.

The memory 204 may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage may have recorded thereon statements and instructions executable by the processor for performing the herein described functions and steps of the PCP/AP 14 or STA 12 (FIG. 1).

Some example embodiments include A-BFT procedures that can be used for RSS beamforming, for example, under future proposals for the IEEE 802.11 standard, such as IEEE 802.11 ay. Some embodiments allow for simultaneous transmission of SSW frames from different STAs over multiple channels, some example embodiments allow for simultaneous transmission of SSW frames from different STAs over the same channel, and some embodiments comprise a combination of both.

Some example embodiments may also include a SSW/SSW-Feedback frame structure, comprising a "Channel Select" subfield which can be used to indicate for example, a selected antenna Sector ID and Antenna ID obtained by training on an indicated channel.

Through the herein described methods, example embodiments can reduce the probability of SSW slot collisions, for example.

Figure 12:
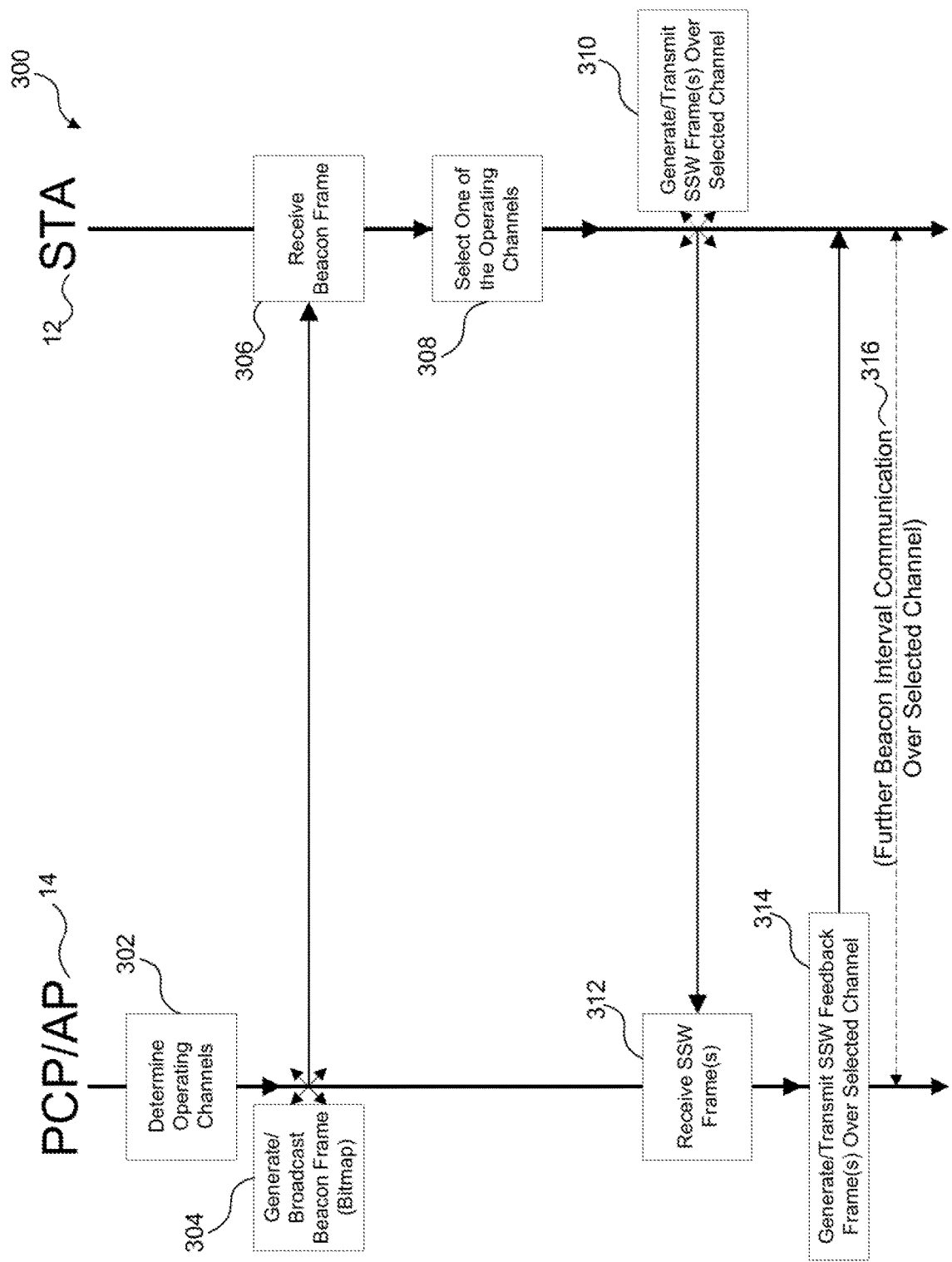
FIG. 12 illustrates an example conversation between a PCP/AP and a STA, for implementation of an example method for broadcasting operating channel indicators, in accordance with an example embodiment.

FIG. 12 illustrates an example conversation between a PCP/AP 14 and a STA 12, for implementation of an example method 300 for broadcasting operating channel indicators, in accordance with an example embodiment. At event 302, the PCP/AP 14 determines, for a plurality of designated channels, which of the designated channels for Beacon Interval communications are operating and which are non-operating. At event 304, the PCP/AP 14 generates a management frame such as a beacon frame in BTI. The beacon frame comprises bit positions that each represent a respective designated channel, and a respective bit value of each bit position indicates the operating or the non-operating of the respective designated channel. Further at event 304, the PCP/AP 14 broadcasts the beacon frame. For example, the broadcast can comprise transmittal of the beacon frame multiple times (or as multiple beacon frames), each broadcast by the PCP/AP 14 on a different sector to cover a plurality of sector directions (e.g. quasi-omni). This beacon frame is broadcast for purposes of network announcement and beamforming training of the PCP/AP's 14 antenna sectors. The broadcasting of the beacon frame is generally not specifically targeted to any particular device at this stage. In an example embodiment, the beacon frame is broadcast over a primary channel. Another example management frame that is transmitted by the PCP/AP 14 is an announcement frame in ATI. Management frames can be unicast transmitted in some example embodiments.

At event 306, the STA 12 receives the management frame (e.g. beacon frame) from the PCP/AP 14. The beacon frame contains a field with bitmap, which can be parsed according to the known association between the bit position and the respective designated channel. The STA 12 is therefore now informed as to which of the plurality of designated channels are operating and which are non-operating. At event 308, the STA 12 selects one of the operating channels for purposes of Beacon Interval communication, including A-BFT communication, for example. In an example embodiment, the operating channel is selected using random channel selection. At event 310, the STA 12 generates and transmits applicable SSW Frame(s) over the selected operating channel(s), e.g. over different sectors and/or channels for beamforming training. Note that one or more other STAs 12 may be performing similar functions as in events 306, 308, 310, with reduced collision based on random channel selection between the multiplicity of STAs 12. In another example embodiment, other channel selection criteria may be used other than random channel selection.

At event 312, as part of the A-BFT process, the PCP/AP 14 receives the SSW Frame(s) that were transmitted from the STAs 12. The received SSW Frame(s) are used by the STA 12 to train its antenna sector for communication with the PCP/AP 14. At event 314, the PCP/AP 14 generates and transmits SSW-Feedback Frame(s), for example over the same selected operating channel that was originally selected by the STA 12. In other example embodiments, the SSW-Feedback frame is sent over a different operating channel. At event 316, additional Beacon Interval communications, such as A-BFT and DTI (including traffic data), can be performed between the PCP/AP 14 and the STA 12, over the same selected operating channel or over different selected operating channels. Further example A-BFT communications include short SSW frames and feedback for short SSW frames.

At least some or all of the method 300 can be repeated or looped, in example embodiments, for example for the next Beacon Interval. Further, in some example embodiments, aspects of the method 300 can be performed concurrently by multiple STAs 12. If the same operating channel is selected by more than one STA 12, further collision reducing methods may be used for that operating channel.

Referring still to the method 300 of FIG. 12, in an example embodiment, at any one or all of events 308, 310, 312, 314, 316, reference to selecting one channel can instead be performed by selecting one or more of the operating channels that are available, and subsequent communication over those selected one or more of the operating channels that are available.

Referring still to the method 300 of FIG. 12, In the case of a plurality of STAs 12, one or more of the "other" STAs 12 may also be configured to perform other channel selection processes alternative to random channel selection.

In an example embodiment, the B6-B7 bits are reserved bits for future protocols or for future use.

In example embodiments, beacon interval communication can include wireless communications, mmWAVE wireless communication and/or 802.11 communications such as 802.11 ay EDMG communication.

Referring again to FIG. 4, the SSW frame 40 can be defined to have twenty-six octets of bits, for example. A short SSW frame (not shown here) can be defined to have less octets than the SSW frame 40, for example six octets of bits. In an example embodiment, a short SSW frame as defined by IEEE 802.11 standards may be used.

An example embodiment is a method implemented by an access point (AP) or personal basic service set (PBSS) control point (PCP), the method comprising: generating a management frame that indicates, for a plurality of designated channels, which of the designated channels are operating and which are non-operating, the management frame having bit positions that each represent a respective designated channel, and a respective bit value of each bit position indicates the operating or the non-operating of the respective designated channel; and transmitting the management frame.

Optionally, in any of the previous examples of the method, the management frame comprises a beacon frame in Beacon Transmission Interval (BTI).

Optionally, in any of the previous examples of the method, the management frame comprises an announcement frame in Announcement Transmission Interval (ATI).

Optionally, in any of the previous examples of the method, the plurality of designated channels are designated for Beacon Interval (BI) communication.

Optionally, in any of the previous examples of the method, the plurality of designated channels are designated for association beamforming training (A-BFT) communication.

Optionally, in any of the previous examples of the method, the plurality of designated channels are designated for Data Transfer Interval (DTI) communication.

Optionally, in any of the previous examples of the method, the plurality of designated channels are designated for Sector Sweep (SSW) frames, SSW-feedback frames, short SSW frames, or feedback for short SSW frames.

Optionally, in any of the previous examples of the method, the management frame is transmitted over a single channel of the plurality of designated channels.

Optionally, in any of the previous examples of the method, the management frame is transmitted over at least two of the designated channels.

Optionally, in any of the previous examples of the method, the method further comprises, prior to said transmitting, determining which of the plurality of channels are operating and which are non-operating.

Optionally, in any of the previous examples of the method, said determining is based on channel load balancing.

Optionally, in any of the previous examples of the method, said determining is based on previous association beamforming training (A-BFT) communication.

Optionally, in any of the previous examples of the method, the method further comprises receiving, in response to the management frame, a sector sweep (SSW) frame from a station on one of the operating channels.

Optionally, in any of the previous examples of the method, for the management frame, an operating channel is indicated by a "1" bit and a non-operating channel is indicated by a "0" bit.

Optionally, in any of the previous examples of the method, the bit positions are grouped into a single octet within the management frame.

Optionally, in any of the previous examples of the method, the octet further comprises reserved bits.

Optionally, in any of the previous examples of the method, a first six bit positions of the octet each represent the respective designated channel, and a last two bit positions of the octet are reserved bits.

Optionally, in any of the previous examples of the method, a first six bit positions of the octet each represent the respective designated channel.

Optionally, in any of the previous examples of the method, said transmitting comprises broadcasting.

Another example embodiment is a method implemented by an access point (AP) or personal basic service set (PBSS) control point (PCP), the method comprising: generating a management frame comprising a frame that indicates, for a plurality of designated channels, which of the designated channels are operating and which are non-operating, said frame having one octet of bits; and transmitting the management frame.

Optionally, in any of the previous examples of the method, said one octet of bits comprises bit positions that each represent a respective designated channel, and a respective bit value of each bit position indicates the operating or the non-operating of the respective designated channel.

Optionally, in any of the previous examples of the method, the octet further comprises reserved bits.

Optionally, in any of the examples of the method, the method further includes: receiving a first sector sweep (SSW) frame sent from a first station on at least one channel of the plurality of designated channels; receiving a second SSW frame sent from a second station on at least one channel of the plurality of designated channels; and transmitting corresponding first and second sector sweep feedback (SSW-feedback) frames to the first and second stations, respectively. Optionally, in any of the examples of described methods, the first SSW-feedback frame is transmitted to the first station on one channel, and the second SSW-feedback frame is transmitted to the second station on another channel.

Another example embodiment is an access point (AP) or personal basic service set (PB SS) control point (PCP), comprising: a memory; at least one transceiver configured to communicate over a plurality of channels; and at least one processor configured to execute instructions stored in the memory to transmit a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Another example embodiment is a non-transitory computer readable medium containing instructions executable by at least one processor of an access point (AP) or personal basic service set (PBSS) control point (PCP), the instructions comprising: instructions for generating a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel; and instructions for transmitting the management frame.

Another example embodiment is a method implemented by a station, the method comprising: receiving, from an access point (AP) or personal basic service set (PBSS) control point (PCP), a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Optionally, in any of the previous examples of the method, the method further comprises selecting one or more channels from the operating channels; and transmitting a frame on the selected one or more operating channels.

Optionally, in any of the previous examples of the method, the frame is a sector sweep (SSW) frame or a short SSW frame.

Optionally, in any of the previous examples of the method, the SSW frame or the short SSW frame is transmitted during association beamforming training (A-BFT).

Optionally, in any of the previous examples of the method, the frame is transmitted during Beacon Interval (BI).

Optionally, in any of the previous examples of the method, the frame is transmitted during Data Transfer Interval (DTI).

Optionally, in any of the previous examples of the method, said selecting comprises randomly selecting said one or more channels from the operating channels.

Another example embodiment is a station, comprising: a memory; at least one transceiver configured to communicate over a plurality of channels; and at least one processor configured to execute instructions stored in the memory to receive, from an access point (AP) or personal basic service set (PBSS) control point (PCP), a management frame that indicates, for a plurality of designated channels, which of the designated channels are operating and which are non-operating, said management frame having bit positions that each represent a respective designated channel, and a respective bit value of each bit position indicates the operating or the non-operating of the respective designated channel.

Through the descriptions of the preceding embodiments, some example embodiments may be implemented by using hardware only or by using software and a necessary universal hardware platform. Based on such understandings, the technical solution of some example embodiments may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the example embodiments described herein. For example, such an execution may correspond to a simulation of the logical operations as described herein. The software product may additionally or alternatively include number of instructions that enable a computer device to execute operations for configuring or programming a digital logic apparatus in accordance with example embodiments.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method implemented by an access point (AP) or personal basic service set (PBSS) control point (PCP), the method comprising:
   generating a Directional Multi-Gigabit (DMG) beacon frame that indicates, for a plurality of designated channels, which of the designated channels are operating and which are non-operating for a station (STA) to communicate during a Beacon Interval (BI), the DMG beacon frame having bit positions that each represent a respective designated channel, and a respective bit value of each bit position indicates the operating or the non-operating of the respective designated channel,
   wherein the indicated designated channels that are operating are indicated for transmitting of, over the indicated designated channels, one or more further management frames to the station (STA) within a Beacon Header Interval (BHI) of the Beacon Interval (BI) and data within a data transmission interval (DTI) of the Beacon Interval (BI) and receiving of, over the indicated designated channels, one or more further management frames from the station (STA) within the Beacon Header Interval (BHI) and data within the data transmission interval (DTI), and
   transmitting the DMG beacon frame within the Beacon Header Interval (BHI).

2. The method as claimed in claim 1, wherein the DMG beacon frame comprises a beacon frame in a Beacon Transmission Interval (BTI).

3. The method as claimed in claim 1, wherein at least one of the further management frames is in Announcement Transmission Interval (ATI).

4. The method as claimed in claim 1, wherein the indicated designated channels that are operating are indicated for association beamforming training (A-BFT) communication.

5. The method as claimed in claim 1, wherein the indicated designated channels that are operating are indicated for Sector Sweep (SSW) frames, SSW-feedback frames, short SSW frames, or feedback for short SSW frames.

6. The method as claimed in claim 1, wherein the DMG beacon frame is transmitted over a single channel of the plurality of designated channels.

7. The method as claimed in claim 1, wherein the DMG beacon frame is transmitted over at least two of the designated channels.

8. The method as claimed in claim 1, further comprising, prior to said transmitting, determining which of the plurality of channels are operating and which of the plurality of channels are non-operating.

9. The method as claimed in claim 8, wherein said determining is based on a previous association beamforming training (A-BFT) communication.

10. The method as claimed in claim 1, further comprising receiving, in response to the DMG beacon frame, a sector sweep (SSW) frame from a station on one of the operating channels.

11. The method as claimed in claim 1, wherein, for the DMG beacon frame, an operating channel is indicated by a "1" bit and a non-operating channel is indicated by a "0" bit.

12. The method as claimed in claim 1, wherein the bit positions are grouped into a single octet within the DMG beacon frame.

13. The method as claimed in claim 12 wherein the octet further comprises reserved bits.

14. The method as claimed in claim 12 wherein a first six bit positions of the octet each represent the respective designated channel, and a last two bit positions of the octet are reserved bits.

15. The method as claimed in claim 12 wherein a first six bit positions of the octet each represent the respective designated channel.

16. The method as claimed in claim 1, wherein said transmitting comprises broadcasting.

17. The method as claimed in claim 1, wherein the AP or the PCP is an Evolved Directional Multi Gigabit (EDMG) device, and wherein at least one management frame of the one or more further management frames is in an EDMG management frame.

18. The method as claimed in claim 1, wherein each designated channel has a bandwidth of 2.16 GHz.

19. The method as claimed in claim 1, wherein the one or more further management frames are for transmission subsequent to the transmitting of the DMG beacon frame.

20. A method implemented by an access point (AP) or personal basic service set (PBSS) control point (PCP), the method comprising:
   generating a Directional Multi-Gigabit (DMG) beacon frame comprising a frame that indicates, for a plurality of designated channels, which of the designated channels are operating and which are non-operating for a station (STA) to communicate during a Beacon Interval (BI), said frame having one octet of bits,
   wherein the indicated designated channels that are operating are indicated for transmitting of, over the indicated designated channels, one or more further management frames to the station (STA) within a Beacon Header Interval (BHI) of the Beacon Interval (BI) and data within a data transmission interval (DTI) of the Beacon Interval (BI) and receiving of, over the indicated designated channels, one or more further management frames from the station (STA) within the Beacon Header Interval (BHI) and data within the data transmission interval (DTI), and transmitting the DMG beacon frame within the Beacon Header Interval (BHI).

21. The method as claimed in claim 20, wherein said one octet of bits comprises bit positions that each represent a respective designated channel, and a respective bit value of each bit position indicates the operating or the non-operating of the respective designated channel.

22. An access point (AP) or personal basic service set (PBSS) control point (PCP), comprising:
a memory;
at least one transceiver configured to communicate over a plurality of channels; and
at least one processor configured to execute instructions stored in the memory to transmit within a Beacon Header Interval (BHI) of a Beacon Interval (BI) a Directional Multi-Gigabit (DMG) beacon frame that indicates, for a plurality of designated channels, which of the designated channels are operating and which are non-operating for a station (STA) to communicate during the Beacon Interval (BI), wherein the indicated channels that are operating are indicated for transmitting of, over the indicated designated channels, one or more further management frames to the station (STA) within the Beacon Header Interval (BHI) and data within a data transmission interval (DTI) of the Beacon Interval (BI) and receiving of, over the indicated designated channels, one or more further management frames from the station (STA) within the Beacon Header Interval (BHI) and data within the data transmission interval (DTI), said DMG beacon frame having bit positions that each represent a respective designated channel, and a respective bit value of each bit position indicates the operating or the non-operating of the respective designated channel.

23. A non-transitory computer readable medium containing instructions executable by at least one processor of an access point (AP) or personal basic service set (PBSS) control point (PCP), the instructions comprising:
instructions for generating a Directional Multi-Gigabit (DMG) beacon frame that indicates, for a plurality of designated channels, which of the designated channels are operating and which are non-operating for a station (STA) to communicate during a Beacon Header Interval (BHI), wherein the indicated designated channels that are operating are indicated for at least transmitting of one or more further management frames to the station (STA) within the Beacon Header Interval (BHI) over the indicated designated channels and receiving of one or more further management frames from the station (STA) within the Beacon Header Interval (BHI) over the indicated designated channels, said DMG beacon frame having bit positions that each represent a respective designated channel, and a respective bit value of each bit position indicates the operating or the non-operating of the respective designated channel; and
instructions for transmitting the DMG beacon frame within the Beacon Header Interval (BHI).

24. A method implemented by a station having at least one transceiver, the method comprising:
receiving within a Beacon Header Interval (BHI) of a Beacon Interval (BI), using the at least one transceiver, from an access point (AP) or personal basic service set (PBSS) control point (PCP), a Directional Multi-Gigabit (DMG) beacon frame that indicates, for a plurality of designated channels, which of the designated channels are operating and which are non-operating for the station to communicate during the Beacon Header Interval (BHI), wherein the indicated designated channels that are operating are indicated for at least transmitting of, over the indicated designated channels, one or more further management frames to the access point (AP) or personal basic service set (PBSS) control point (PCP) within the Beacon Header Interval (BHI) and data within a data transmission interval (DTI) of the Beacon Interval (BI) and receiving of, over the indicated designated channels, from the access point (AP) or personal basic service set (PBSS) control point (PCP), one or more further management frames within the Beacon Header Interval (BHI) and data within the data transmission interval (DTI), said DMG beacon frame having bit positions that each represent a respective designated channel, and a respective bit value of each bit position indicates the operating or the non-operating of the respective designated channel; and
receiving over at least one of the operating channels the one or more further management frames within the Beacon Header Interval (BHI) and transmitting over at least one of the operating channels the one or more further management frames within the Beacon Header Interval (BHI).

25. The method as claimed in claim 24, further comprising:
selecting one or more channels from the operating channels; and
wherein the transmitting of at least one of the further management frames is performed on the selected one or more operating channels.

26. A station, comprising:
a memory;
at least one transceiver configured to communicate over a plurality of channels; and
at least one processor configured to execute instructions stored in the memory to, using the at least one transceiver:
receive within a Beacon Header Interval (BHI) of a Beacon Interval (BI), from an access point (AP) or personal basic service set (PBSS) control point (PCP), a Directional Multi-Gigabit (DMG) beacon frame that indicates, for a plurality of designated channels, which of the designated channels are operating and which are non-operating for the station to communicate during the Beacon Header Interval (BHI), wherein the indicated designated channels that are operating are indicated for transmitting of, over the indicated designated channels, one or more further management frames to the access point (AP) or personal basic service set (PBSS) control point (PCP) within the Beacon Header Interval (BHI) and data within a data transmission interval (DTI) of the Beacon Interval (BI) and receiving of, over the indicated designated channels, from the access point (AP) or personal basic service set (PBSS) control point (PCP), one or more further management frames within the Beacon Header Interval (BHI) and data within the data transmission interval (DTI), said management frame or said DMG beacon frame having bit positions that each represent a respective designated channel, and a respective bit value of each bit position indicates the operating or the non-operating of the respective designated channel; and receive over at least one of the operating channels the one or more further management frames within the Beacon Header Interval (BHI) and transmit over at least one of the operating channels the one or more further management frames within the Beacon Header Interval (BHI).

* * * * *